(12) United States Patent
Seki

(10) Patent No.: US 11,201,985 B2
(45) Date of Patent: Dec. 14, 2021

(54) INFORMATION PROCESSING APPARATUS AND IMAGE FORMING APPARATUS TO ALIGN PRINT POSITIONS

(71) Applicant: CANON KABUSHIKI KAISHA, Tokyo (JP)

(72) Inventor: Hirotaka Seki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/128,663

(22) Filed: Dec. 21, 2020

(65) Prior Publication Data
US 2021/0203804 A1     Jul. 1, 2021

(30) Foreign Application Priority Data
Dec. 26, 2019   (JP) .............................. JP2019-236552

(51) Int. Cl.
*H04N 1/00*    (2006.01)
*H04N 1/387*   (2006.01)
*H04N 1/23*    (2006.01)

(52) U.S. Cl.
CPC ......... *H04N 1/387* (2013.01); *H04N 1/00045* (2013.01); *H04N 1/00408* (2013.01); *H04N 1/00779* (2013.01); *H04N 1/2346* (2013.01)

(58) Field of Classification Search
CPC ............... H04N 1/387; H04N 1/00045; H04N 1/00408; H04N 1/00779; H04N 1/2346
USPC .................................................. 358/400, 474
See application file for complete search history.

(56) References Cited

U.S. PATENT DOCUMENTS

| | | | |
|---|---|---|---|
| 6,665,097 B1* | 12/2003 | Inagaki | G02B 7/028 |
| | | | 250/201.2 |
| 2018/0165044 A1 | 6/2018 | Tanaka | |
| 2019/0109957 A1* | 4/2019 | Date | H04N 1/4076 |
| 2019/0377295 A1* | 12/2019 | Igarashi | G03G 15/5095 |
| 2021/0084192 A1* | 3/2021 | Kasuya | H04N 1/3873 |

* cited by examiner

*Primary Examiner* — Gabriel I Garcia
(74) *Attorney, Agent, or Firm* — Rossi, Kimms & McDowell LLP

(57) ABSTRACT

An information processing apparatus capable of executing adjustment of an image formation position at a timing determined based on the number of printed sheets according to a user's request. Adjustment modes for use in adjusting geometrical characteristics of an image which is printed on a sheet are displayed for causing an image forming apparatus to print an adjustment chart. A controller receives first information indicating whether or not to execute a first adjustment mode for causing the image forming apparatus to print the adjustment chart based on the number of sheets on which images have been printed by the image forming apparatus, and receives second information indicating whether or not to execute a second adjustment mode for causing the image forming apparatus to print the adjustment chart based on a result of detection by a temperature sensor provided in the image forming apparatus.

8 Claims, 14 Drawing Sheets

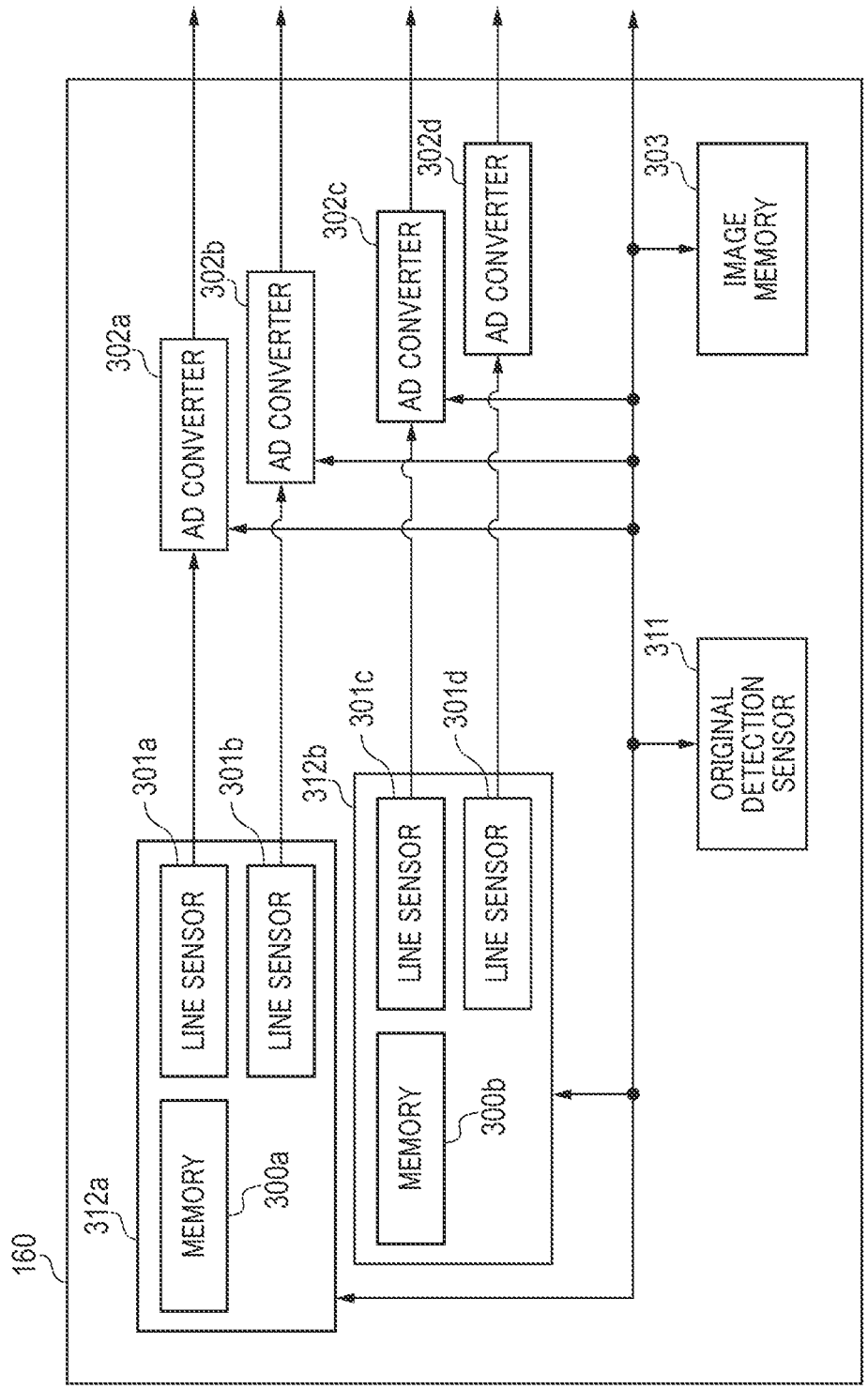

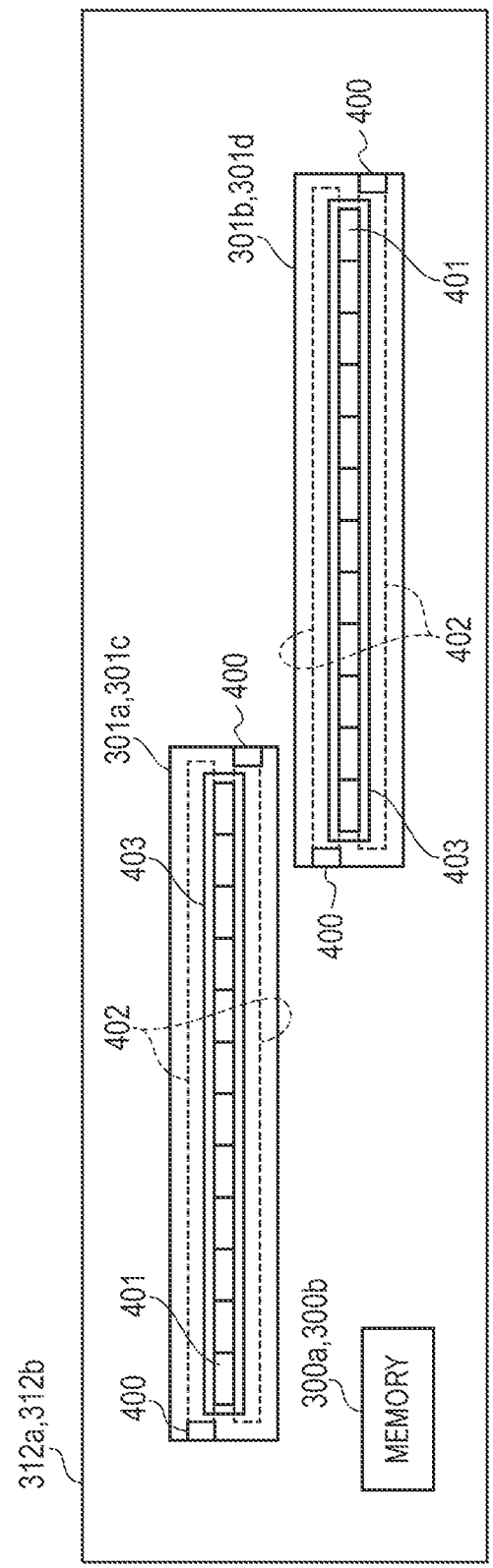

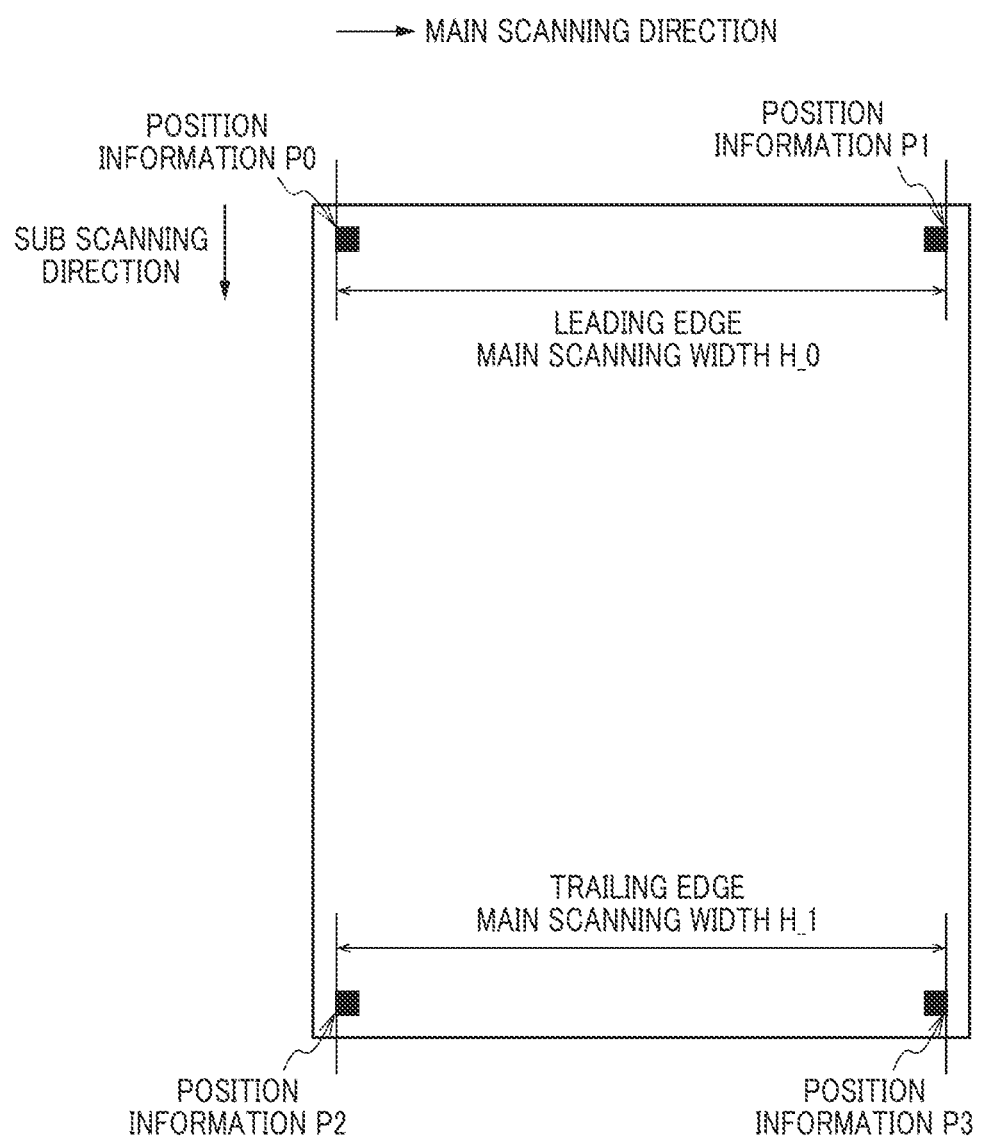

INFORMATION PROCESSING APPARATUS AND IMAGE FORMING APPARATUS TO ALIGN PRINT POSITIONS

BACKGROUND OF THE INVENTION

Field of the Invention

The present invention relates to a technique for controlling the timing of adjusting a print position on a sheet.

Description of the Related Art

There is conventionally known an image forming apparatus that has a print position adjusting function of adjusting a print position of an image (also referred to as the image formation position) on a sheet such that the image is printed on an intended position on the sheet. For example, in double-sided printing, by adjusting the print position, it is possible to align print positions of an image on a front side of a sheet and an image on a reverse side of the sheet. The print position adjustment is processing for correcting geometrical characteristics of an image which is formed by the image forming apparatus to ideal geometrical characteristics. As a method of adjusting the geometrical characteristics of the image which is formed by the image forming apparatus, a method is known in which image data is subjected to affine transformation.

To adjust the print position, there are executed the following steps: A step in which the image forming apparatus prints an adjustment chart on a sheet. A step in which a reading device reads the sheet on which the adjustment chart has been printed (this sheet is hereinafter referred to as the "test chart"). A step in which an information processing apparatus acquires data concerning results of reading the test chart. A step in which displacement of a print position is detected based on the acquired data. A step in which an amount of displacement of the print position, which is derived from a detection result, is stored as an adjustment condition of the sheet. Then, when printing is performed using a sheet of the same type as the test chart, a print position of an image which is formed by the image forming apparatus on the sheet is controlled based on the adjustment condition.

It is desirable that the print position adjustment is performed for each package of sheets which are used or according to a type of sheets which are used. This is because the print position slightly changes depending on variation in the cutting of sheets from one package to another. Further, a difference in sheet conveying property, which occurs between different sheet types each defined by a sheet size, a basis weight (weight), and a material, causes a minute difference in print position.

However, it is troublesome for a user to properly determine whether or not the print position adjustment is required and execute the print position adjustment. As a solution to this inconvenience, United States Patent Application Publication US2018/0165044 discloses an information processing apparatus that provides a notification for prompting a user to perform the print position adjustment at first and second timings having a certain time interval therebetween. Further, this conventional information processing apparatus determines a third timing based on results of reading a test chart which are obtained at the first and second timings, and provides a notification for prompting the user to perform the print position adjustment at the third timing.

However, according to United States Patent Application Publication US2018/0165044, the time interval to the next print position adjustment is updated based on results of reading the test chart, and the execution timing of the print position adjustment is determined depending on the elapsed time.

SUMMARY OF THE INVENTION

The present invention provides an information processing apparatus and an image forming apparatus that are capable of executing adjustment of an image formation position at a timing determined based on the number of printed sheets according to a user's request.

In a first aspect of the present invention, there is provided an information processing apparatus comprising a display that displays a plurality of adjustment modes for causing an image forming apparatus to print an adjustment chart, the adjustment chart being for use in adjusting geometrical characteristics of an image which is printed on a sheet, a controller configured to receive first information indicating whether or not to execute a first adjustment mode for causing the image forming apparatus to print the adjustment chart based on the number of sheets on which images are printed by the image forming apparatus, and receive second information indicating whether or not to execute a second adjustment mode for causing the image forming apparatus to print the adjustment chart based on a result of detection by a temperature sensor provided in the image forming apparatus.

In a second aspect of the present invention, there is provided an image forming apparatus comprising an image forming unit that forms an image on a sheet, a sensor that detects a temperature, a display, and a controller configured to control the image forming unit so as to form an adjustment chart on a sheet, based an adjustment mode, the adjustment mode including a first adjustment mode for causing the image forming unit to form the adjustment chart based on the number of sheets on which images are formed by the image forming unit and a second adjustment mode for causing the image forming unit to form the adjustment chart based on a result of detection by the sensor, acquire read data concerning the adjustment chart on the sheet, control geometrical characteristics of an image which is formed on a sheet by the image forming unit, based on the read data, control the display to display the first and second adjustment modes for causing the image forming unit to form the adjustment chart, receive first information indicating whether or not to execute the first adjustment mode, and receive second information indicating whether or not to execute the second adjustment mode.

According to the present invention, it is possible to execute adjustment of an image formation position at a timing determined based on the number of printed sheets according to a user's request.

Further features of the present invention will become apparent from the following description of exemplary embodiments (with reference to the attached drawings).

BRIEF DESCRIPTION OF THE DRAWINGS

FIG. 3 is a block diagram showing the system configuration of a reading device.

FIG. 4 is a diagram showing the configuration of line sensor units.

FIG. 6 is a diagram showing an example of the test chart.

DESCRIPTION OF THE EMBODIMENTS

The present invention will now be described in detail below with reference to the accompanying drawings showing embodiments thereof.

Figure 1:
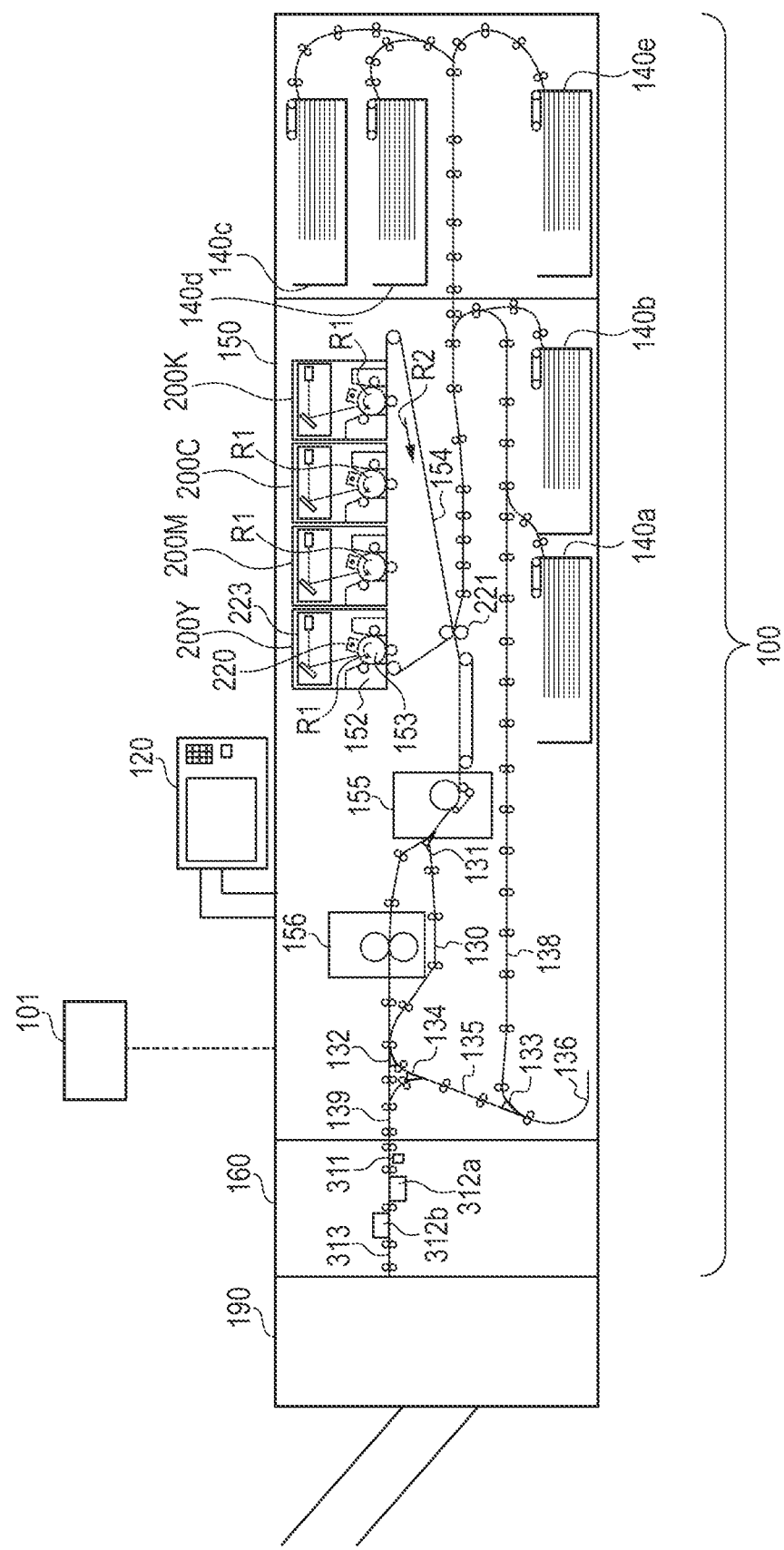
FIG. 1 is a schematic cross-sectional view of an image forming system.
Figure 2:
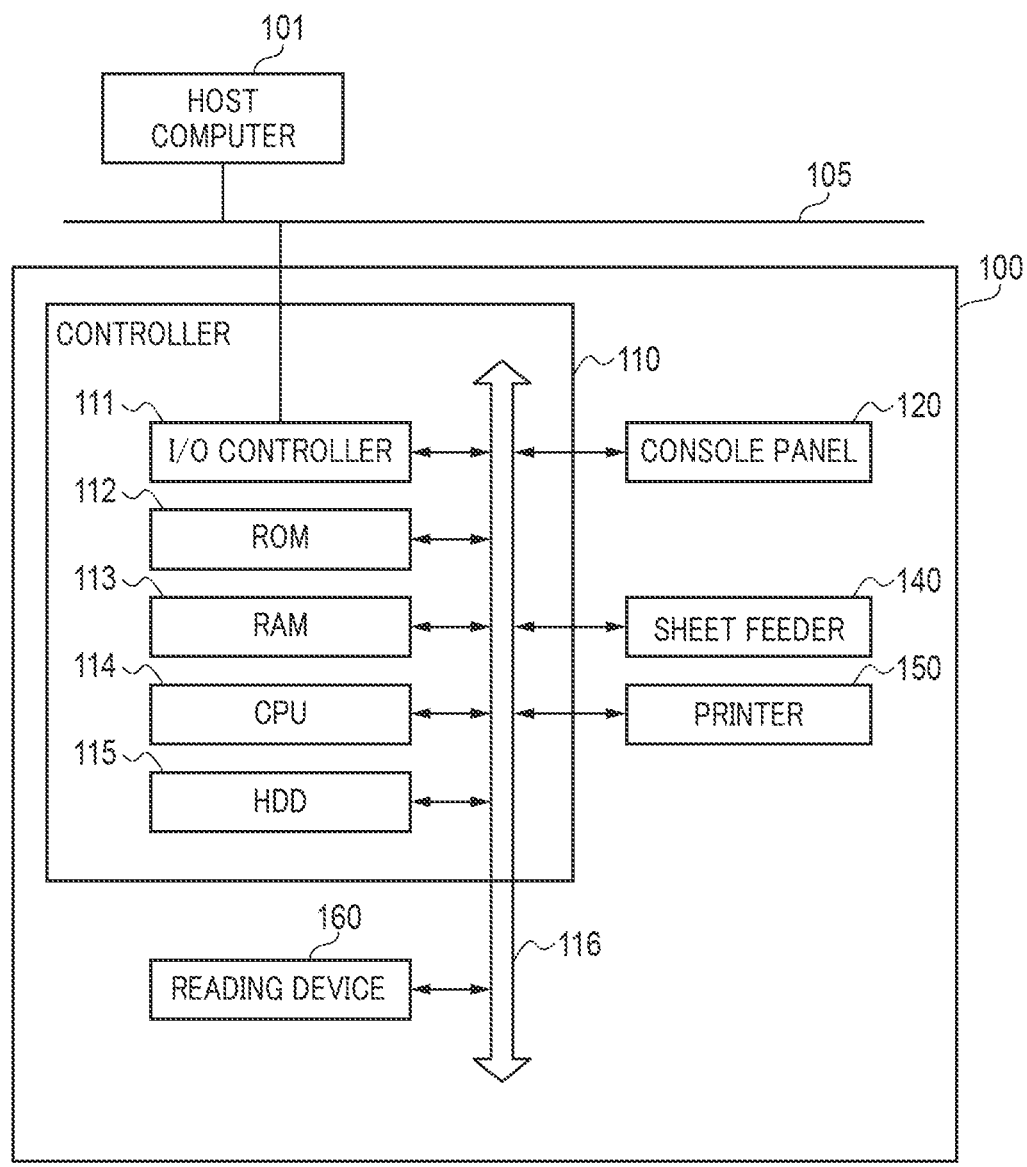
FIG. 2 is a block diagram of the image forming system.

FIG. 1 is a schematic cross-sectional view of an image forming system. FIG. 2 is a block diagram of the image forming system. This image forming system includes an image forming apparatus 100, a finisher 190, and a host computer 101.

As shown in FIG. 2, the image forming apparatus 100 and the host computer 101 are communicably connected to each other via a network 105. The network 105 is a communication line, such as a LAN (Local Area Network) or a WAN (Wide Area Network). Each of the image forming apparatus 100 and the host computer 101 may be connected to the network 105 in plurality.

The host computer 101 is e.g. a server and transmits a print job to the image forming apparatus 100 via the network 105. This print job includes various information necessary for printing, such as image data, a type of sheets as recording sheets which are used for printing, the number of sheets which are to be printed, and an instruction of double-sided or single-sided printing.

The image forming apparatus 100 includes a controller 110, a console panel 120, a sheet feeder 140, a printer 150, and a reading device 160. The controller 110, the console panel 120, the sheet feeder 140, the printer 150, and the reading device 160 are communicably interconnected via a system bus 116. The image forming apparatus 100 performs an image forming operation based on a print job acquired from the host computer 101.

The controller 110 controls the units of the image forming apparatus 100. The console panel 120 is a user interface and includes operation buttons, numeric keys, and an LCD (Liquid Crystal Display). An operator can input a print job, a command, print settings, and so forth, to the image forming apparatus 100 via the console panel 120. The console panel 120 has a display section, such as the LCD, on which a setting screen and a state of the image forming apparatus 100 are displayed.

The sheet feeder 140 includes sheet feeding cassettes 140a, 140b, 140c, 140d, and 140e as a plurality of sheet feeding cassettes for storing sheets (see FIG. 1). The sheet feeder 140 sequentially feeds sheets one by one from a topmost sheet of a sheet bundle stacked on each sheet feeding cassette. The sheet feeder 140 conveys a sheet fed from the sheet feeding cassette to the printer 150. Note that the number of sheet feeding cassettes is not particularly limited and may be one.

The printer 150 forms an image on a sheet supplied from the sheet feeder 140 based on image data. The specific configuration of the printer 150 will be described hereinafter with reference to FIG. 1. The reading device 160 reads a printed sheet generated by the printer 150 and transfers a reading result (read data) to the controller 110.

The configuration of the controller 110 will be described. The controller 110 includes a ROM (Read Only Memory) 112, a RAM (Random Access Memory) 113, and a CPU (Central Processing Unit) 114. Further, the controller 110 includes an I/O controller 111 and an HDD (Hard Disk Drive) 115.

The I/O controller 111 is an interface that controls communication with the host computer 101 and other apparatuses via the network 105. The ROM 112 stores various control programs. The RAM 113 functions as a system work memory into which each control program stored in the ROM 112 is loaded. The CPU 114 comprehensively controls the image forming apparatus 100 by executing the control programs loaded into the RAM 113. The HDD 115 is a large-capacity storage device. The HDD 115 stores the control programs and various data, such as image data used for an image formation process (printing process). The modules in the controller 110 are interconnected via the system bus 116.

As shown in FIG. 1, the finisher 190 is connected to the downstream side of the reading device 160. The finisher 190 is a post-processing apparatus that performs post-processing on sheets printed by the printer 150. The finisher 190 performs stapling on printed sheets, sorting of printed sheets, and so forth.

The printer 150 will be described. As shown in FIG. 1, the printer 150 as an image forming section (image forming unit) includes four image forming stations 200 (200Y, 200M, 200C, and 200K). The image forming stations 200Y, 200M, 200C, and 200K form images of yellow, magenta, cyan, and black, respectively. The image forming stations 200 have almost the same configuration. The common components between them will be described using the configuration of the image forming station 200Y as a representative.

The image forming station 200Y includes a photosensitive drum 153, a charger 220, an exposure device 223, and a developing device 152. The photosensitive drum 153 is driven by a motor (not shown) to rotate in a direction indicated by an arrow R1. The charger 220 charges the surface of the photosensitive drum 153. The exposure device 223 exposes the photosensitive drum 153. As a result, an electrostatic latent image is formed on the photosensitive drum 153. The developing device 152 develops the electrostatic latent image on the photosensitive drum 153 with developer (toner). With this, the electrostatic latent image on the photosensitive drum 153 is developed, whereby a toner image is formed on the photosensitive drum 153.

The printer 150 includes an intermediate transfer belt 154 onto which the toner images formed by the respective image forming stations 200 are transferred. The yellow, magenta, cyan, and black toner images formed by the respective image forming stations 200 are transferred onto the intermediate transfer belt 154 such that the images are superimposed one upon another. As a result, a full-color image is formed on the intermediate transfer belt 154. The image on the intermediate transfer belt 154 is conveyed in a direction indicated by an arrow R2. The image formed on the intermediate transfer belt 154 is transferred onto a sheet conveyed from the sheet feeder 140 at a nip between the intermediate transfer belt 154 and a transfer roller 221.

The printer 150 has a first fixing device 155 and a second fixing device 156. The fixing devices 155 and 156 each apply heat and pressure to the image transferred onto the sheet to thereby fix the image on the sheet. The fixing devices 155 and 156 are each provided with a fixing roller containing a heater and a pressure belt for bringing a sheet into pressure contact with the fixing roller. Each roller is driven by a motor, not shown, to convey the sheet. The second fixing device 156 is arranged at a location downstream of the first fixing device 155 in a sheet conveying direction. The second fixing device 156 is used to increase gloss and secure the fixing property of the image on the sheet having passed through the first fixing device 155. Depending on the type of a sheet, the second fixing device 156 is not required to be used. In this case, the sheet is conveyed to a conveying path 130 without passing through the second fixing device 156. A flapper 131 switches between guiding the sheet to the conveying path 130 and guiding the same to the second fixing device 156.

A flapper 132 switches between guiding the sheet to a conveying path 135 and guiding the same to a discharging path 139. As one example, in a double-sided printing mode, the flapper 132 guides the sheet having the image formed on the first side thereof, to the conveying path 135. As another example, in a face-up discharging mode, the flapper 132 guides the sheet having the image formed on the first side thereof, to the discharging path 139. As a still another example, in a face-down discharging mode, the flapper 132 guides the sheet having the image formed on the first side thereof, to the conveying path 135. Further, in a case where a test chart (described hereinafter with reference to FIGS. 5 and 6) is made by printing an adjustment chart, described hereinafter, on a sheet, the flapper 132 guides the sheet having the adjustment chart printed on a first side thereof, to the conveying path 135 so as to print the test chart on a second side of the sheet.

The sheet conveyed to the conveying path 135 is conveyed to a reversing portion 136. After the conveying operation is once stopped, the sheet conveyed to the reversing portion 136 is switched back at the reversing portion 136 to reverse the sheet conveying direction. Next, a flapper 133 switches between guiding the sheet to a conveying path 138 and guiding the same to the conveying path 135. As one example, in the double-sided printing mode, the flapper 133 guides the sheet having been switched back, to the conveying path 138.

As another example, in the face-down discharging mode, the flapper 133 guides the sheet having been switched back, to the conveying path 135. The sheet conveyed to the conveying path 135 by the flapper 133 is guided into the discharging path 139 by a flapper 134. Further, in a case where the adjustment chart is to be printed on the second side of the sheet, the flapper 133 guides the sheet having been switched back, to the conveying path 138. The sheet conveyed to the conveying path 138 by the flapper 133 is conveyed to the nip between the intermediate transfer belt 154 and the transfer roller 221. Thus, the front and reverse sides of the sheet at the time of passing the nip are inverted, whereby an image is printed on the second side.

The reading device 160 is connected to the downstream side of the printer 150 in the sheet conveying direction. The reading device 160 as reading means (reading section) reads the adjustment chart on the test chart in a print position adjustment process (also referred to as the printing position adjustment process), described hereinafter. The sheet supplied from the printer 150 to the reading device 160 is conveyed along a conveying path 313. The reading device 160 includes an original detection sensor 311 and line sensor units 312 (312*a* and 312*b*). The reading device 160 reads the adjustment chart printed by the printer 150 on the test chart using the line sensor units 312*a* and 312*b* while conveying the test chart along the conveying path 313. The test chart having the adjustment chart printed thereon is further conveyed to the finisher 190 along the conveying path 313.

The original detection sensor 311 is e.g. an optical sensor having a light emission element and a light reception element. The original detection sensor 311 detects a leading edge of the test chart in the conveying direction, which is being conveyed along the conveying path 313. Note that the controller 110 causes the reading device 160 to start a reading operation, based on a timing at which the leading edge of the test chart is detected by the original detection sensor 311.

The line sensor units 312*a* and 312*b* read the adjustment chart on the test chart. The adjustment chart is printed on both of the front side and reverse side of the sheet, for example. The line sensor units 312*a* and 312*b* are arranged at such respective locations that the conveying path 313 is sandwiched therebetween so as to read both sides of the test chart. In a case where the print position adjustment process is performed, the image forming apparatus 100 detects a displacement amount of the print position (image formation position) of the adjustment chart based on a result of reading the test chart by the line sensor units 312*a* and 312*b*. Then, the controller 110 controls the image formation process based on the displacement amount of the print position. For example, the controller 110 corrects the print position such that the print position on the sheet is adjusted to an ideal position.

FIG. 3 is a block diagram showing the system configuration of the reading device 160. The reading device 160 is provided with an image memory 303, the original detection sensor 311, AD converters 302 (302*a*, 302*b*, 302*c*, and 302*d*), and the line sensor units 312*a* and 312*b*. The line sensor unit 312*a* includes a memory 300*a* and line sensors 301*a* and 301*b*. The line sensor unit 312*b* includes a memory 300*b* and line sensors 301*c* and 301*d*. Each line sensor 301 is implemented e.g. by an CIS (Contact Image Sensor). The line sensor units 312, the AD converters 302, the image memory 303, and the original detection sensor 311 are connected to the CPU 114 and controlled by the CPU 114.

The line sensor unit 312*a* reads an image on the front side of the test chart, and the line sensor unit 312*b* reads an image on the reverse side of the same. Analog signals output from the line sensors 301*a*, 301*b*, 301*c*, and 301*d* are converted to digital signals (image data) by the AD converters 302*a*, 302*b*, 302*c*, and 302*d*, respectively, and then sent to the CPU 114. The image memory 303 stores image data necessary for image processing performed by the CPU 114. For example, the image data for causing the printer 150 to print the test chart is stored in the image memory 303.

FIG. 4 is a diagram showing the configuration of the line sensor units 312*a* and 312*b* (the line sensors 301*a*, 301*b*, 301*c*, and 301*d*). Referring to FIG. 4, a long direction of the line sensor units 312*a* and 312*b* is parallel to a main scanning direction, and a short direction of the line sensor units 312*a* and 312*b* is parallel to a sub scanning direction (sheet conveying direction). The line sensor units 312*a* and 312*b* have the same configuration, and hence the reference numerals of the line sensors of the two are shown in FIG. 4. In the following description, the component elements of the line sensor unit 312a will be described as representatives of those of the two unless otherwise specified.

In the line sensor unit 312a, the line sensor 301a and the line sensor 301b are arranged in a zigzag fashion such that they partially overlap each other as viewed from the sub scanning direction. The memory 300a stores information of a distance between the two line sensors associated with each other (between the line sensor 301a and the line sensor 301b in the line sensor unit 312a) in the sub scanning direction.

The line sensors 301a and 301b each have a lens array 403, a sensor chip group 401, two LEDs 400, and two light guiding bodies 402. Each LED 400 is a light source that emits white light. Each light guiding body 402 is a light guiding body for irradiating an original (test chart) with light emitted from an associated one of the LEDs 400. Each LED 400 is arranged at an end of an associated one of the light guiding bodies 402 in the long direction.

The sensor chip group 401 is a chip group formed by three lines of chips on which RGB color filters are applied. Light emitted from each LED 400 is diffused through the associated light guiding body 402 to an end thereof where the LED 400 is not arranged, and is emitted from portions of the light guiding body 402 each having a curvature, to illuminate the whole main scanning area of the original. This realizes "the both-side illuminating configuration" that is capable of irradiating light toward where the lens array 403 is located, in two directions, i.e. from a leading edge side and a trailing edge side of an original-reading line in the sub scanning direction. Light emitted from the light guiding bodies 402 irradiates the original, and the light diffused from the original surface forms images on the sensor chip group 401 by the lens array 403. Note that the line sensors 301a and 301c and the line sensors 301b and 301d are arranged to perform scanning in directions different from each other in the main scanning direction.

Figure 5A:
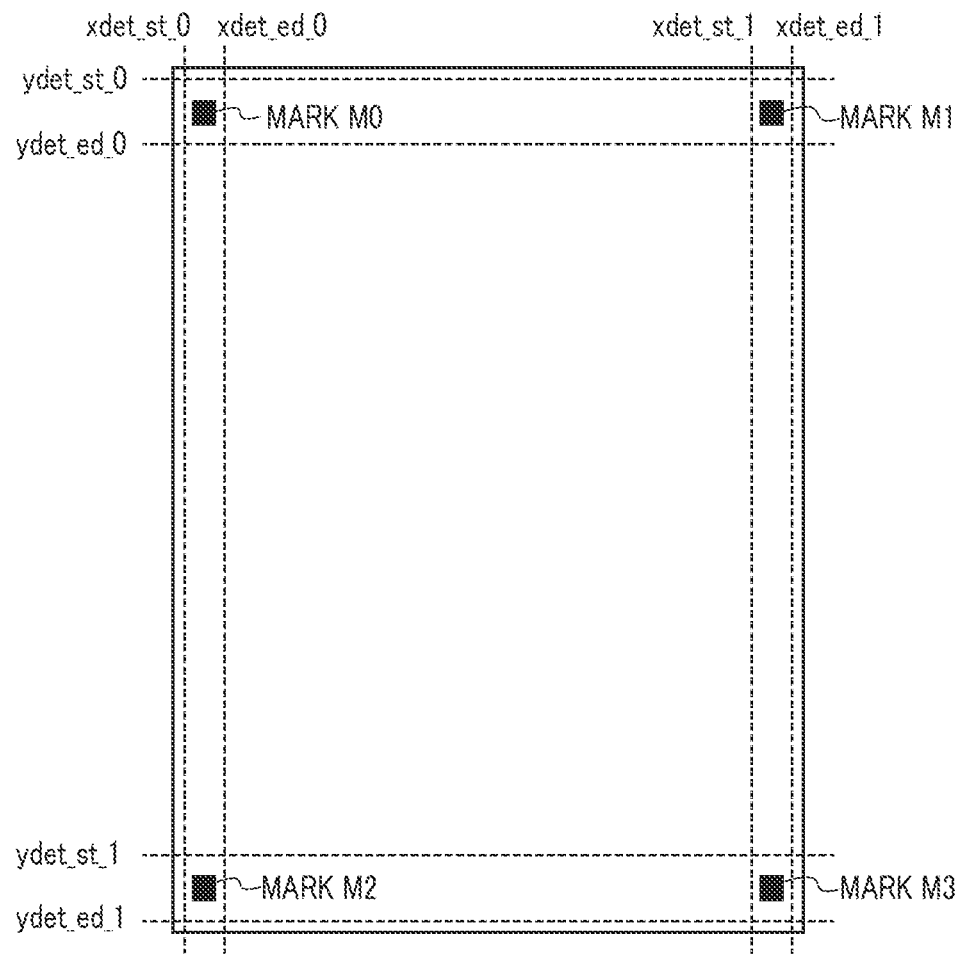
FIGS. 5A and 5B are diagrams showing a test chart and a mark, respectively.
Figure 5B:
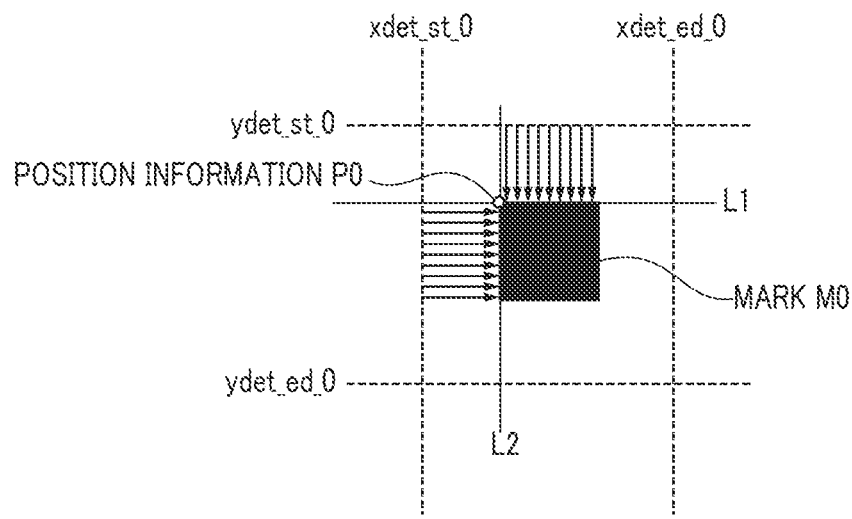

FIG. 5A is a diagram showing an example of the test chart on which the adjustment chart has been printed. FIG. 5B is a diagram showing one mark of the adjustment chart.

The adjustment chart is formed by four marks M (M0 to M3). The test chart is made by printing the four marks M on each of the front and reverse sides of a sheet. FIG. 5A shows the front side of the test chart as a representative. The marks M are arranged in the four corners of the test chart. The adjustment chart shown in FIG. 5A is an example, and the shape, number, and arranged position of the marks are not limited to the illustrated example. Further, the elements included in the adjustment chart are not limited to those recognized as marks, but may be characters or numbers.

A description will be given of a method of acquiring a position of an apex, which is closest to an adjacent apex of the test chart, out of the apexes of each mark of the test chart. The CPU 114 reads out image data for printing the adjustment chart from the image memory 303 and acquires edge detection ranges (xdet_st_m to xdet_ed_m and ydet_st_m to ydet_ed_m: m represents a value of 0 or 1) enclosing the marks in the four corners. Then, the CPU 114 detects edges of each mark within the edge detection range associated therewith.

As shown in FIG. 5B, with respect to the mark M0, to acquire position information P0 indicative of the position of the apex, the CPU 114 detects edges of front and side ends of the mark M0 on respective sides closer to associated ends of the test chart. The CPU 114 calculates an approximate straight line L1 from the position of the edge of the front end and calculates an approximate straight line L2 from the position of the edge of the side end. Then, the CPU 114 calculates (identifies) an intersection of the approximate straight line L1 and the approximate straight line L2, as the position information P0 of the mark M0. The CPU 114 stores the position information P0 in an internal register of the CPU 114 or in the RAM 113. This processing is also performed for the mark M0 on the reverse side of the test chart and each of the marks M1 to M3 on the front and reverse sides. Therefore, the position information items P0 to P3 associated with both of the front and reverse sides of the test chart are identified and stored.

FIG. 6 is a diagram showing an example of the test chart for explaining the print position adjustment process. The print position adjustment process is a process for correcting geometrical characteristics of an image which is formed by the image forming apparatus 100 to ideal geometrical characteristics. The CPU 114 calculates a main scanning width H_0 on a leading edge side from the four position information items P0 to P3 with respect to each of the front and reverse sides of the test chart. The main scanning width H_0 on the leading edge side is calculated from a difference between the position information P0 and the position information P1 in the main scanning direction. Similarly, a main scanning width H_1 on a trailing edge side is calculated from a difference between the position information P2 and the position information P3 in the main scanning direction. Although the main scanning width is described here, respective sub scanning widths on a left side and a right side can be calculated by the same method.

Thus, an adjustment condition which is information on the scanning width and the like is generated by the print position adjustment process. The adjustment condition is information for adjusting the position of an image on a sheet, which is formed by the printer 150. This adjustment condition also includes a displacement amount of the print position between the front side and the reverse side. This adjustment condition is reflected on the next operation of image formation. The CPU 114 outputs the adjustment condition to the printer 150 when printing is performed and performs control such that the print position is corrected when an image is formed. For example, the CPU 114 performs known image processing, e.g. by the bilinear method, such that the main scanning widths H_0 and H_1 both become equal to an ideal main scanning width. Further, the CPU 114 may perform image processing on image data, based on the displacement amount of the print position (adjustment condition), such that geometrical characteristics of an image which is formed by the image forming apparatus 100 become ideal geometrical characteristics. As the image processing, affine transformation is known, for example. Note that the method for correcting the geometrical characteristics of an image which is formed on a sheet by the image forming apparatus 100 to ideal geometrical characteristics is not limited to the above-mentioned methods, but it is only required to be a known method.

Incidentally, the causes of a change in print position include not only a sheet type and variation in the cutting of sheets from one package to another, but also changes in the temperature of the image forming apparatus.

Figure 7:
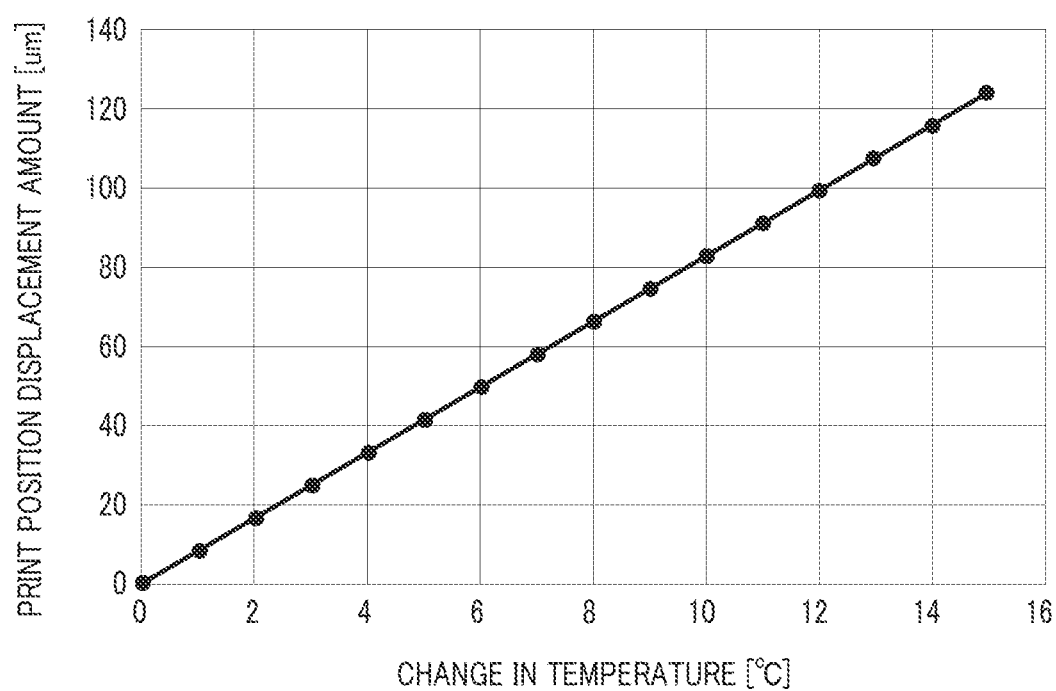
FIG. 7 is a diagram showing a relationship between changes in temperature in the vicinity of an exposure device and displacement amounts of a print position.

FIG. 7 is a diagram showing a relationship between temperature changes in the vicinity of the exposure device 223 and displacement amounts of the print position. The temperature of the exposure device 223 is detected e.g. by a thermistor, not shown, and information of the detected temperature is supplied to the CPU 114. As the change in temperature in the vicinity of the exposure device 223 becomes larger, the displacement amount of the print position becomes larger. This is because when the temperature within the image forming apparatus increases, a lens, etc., for transmitting and collecting light from a laser light source for printing an image are minutely deformed or thermally shrunk, which affects the print position. Therefore, when determining the execution timing of print position adjustment, it is desirable to consider not only the number of printed sheets, but also a change in the temperature of the apparatus.

Further, the internal temperature of the image forming apparatus 100 has characteristics that the temperature changes according to a change of the printing conditions, but is stabilized after the lapse of a certain time period. More specifically, when the image forming apparatus 100 is powered on, the fixing devices 155 and 156 are heated and the temperature of the image forming apparatus 100 quickly increases. Then, the fixing devices 155 and 156 are heated up to a target temperature and then shifted to a state in which the temperature of the image forming apparatus 100 remains balanced at the target temperature. This state is referred to as the "equilibrium state".

As the temperature of the apparatus increases, the lens, etc., for transmitting and collecting light from the laser light source for printing an image are deformed or thermally shrunk. However, when the apparatus reaches the equilibrium state, the change in the temperature of the apparatus is reduced, and hence the necessity of the print position adjustment due to deformation caused by heat or thermal shrink is reduced. Therefore, if the print position adjustment is frequently performed depending on the elapsed time although displacement of the print position hardly occurs in the equilibrium state, sheets for printing the test chart are wastefully consumed. From this point of view, it is also desirable to consider a change in the temperature of the apparatus when determining the execution timing of the print position adjustment. To cope with this, the present embodiment makes it possible to perform the print position adjustment at a proper timing depending on one or both of the number of printed sheets and the change in the temperature of the apparatus according to a user's setting.

Figure 8A:
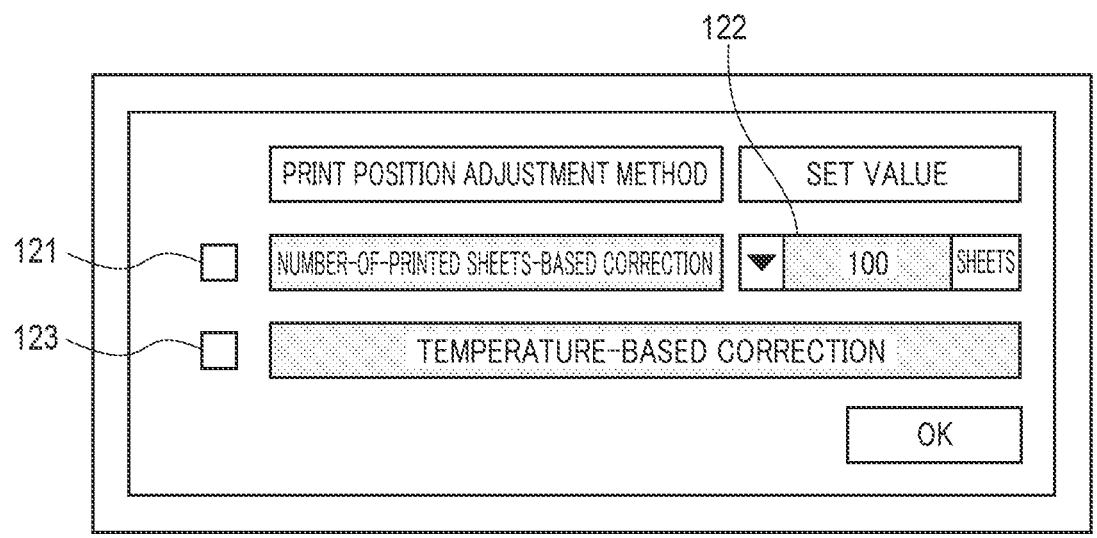
FIGS. 8A and 8B are diagrams each showing an example of an adjustment setting screen.

FIGS. 8A and 8B and FIGS. 9A and 9B are diagrams each showing an example of an adjustment setting screen. This adjustment setting screen is displayed on the console panel 120, and receive a selection input from a user. FIG. 8A shows the adjustment setting screen in an initial state. This adjustment setting screen includes a number-of-printed sheets-based correction button 121, a number-of-printed sheets designation field 122, and a temperature-based correction button 123.

The number-of-printed sheets-based correction button 121 receives a setting for enabling/disabling execution of the print position adjustment process (first position adjustment) whenever a designated number of sheets is printed. When the number-of-printed sheets-based correction button 121 is set to be enabled, i.e. checked, the manner of display is changed, and the execution timing of the print position adjustment is set to be determined according to the number of printed sheets. That is, on condition that the number-of-printed sheets-based correction button 121 is set to be enabled, in a case where the number of sheets printed after the last execution of the print position adjustment reaches the designated number of printed sheets, the next print position adjustment is executed. The number of printed sheets in the number-of-printed sheets designation field 122 can be designated when the number-of-printed sheets-based correction button 121 is set to be enabled. The user can designate the number of printed sheets at which the print position adjustment is to be executed using the number-of-printed sheets designation field 122. Note that although the number-of-printed sheets designation field 122 is configured such that the designated number is selected from a plurality of options, the number-of-printed sheets designation field 122 may be configured such that the user can directly input a numerical value.

The temperature-based correction button 123 receives a setting for enabling/disabling execution of the print position adjustment process (second position adjustment) based on a change in the temperature. When the temperature-based correction button 123 is set to be enabled, i.e. checked, the manner of display is changed, and the execution timing of the print position adjustment is set to be determined according to an amount of change in the temperature of the printer 150. That is, on condition that the temperature-based correction button 123 is set to be enabled, in a case where the amount of change in the temperature of the printer 150 after the last execution of the print position adjustment exceeds a predetermined amount, the next print position adjustment is executed. In FIG. 8A, the number-of-printed sheets-based correction button 121 and the temperature-based correction button 123 are both in the disabled state.

Figure 8B:
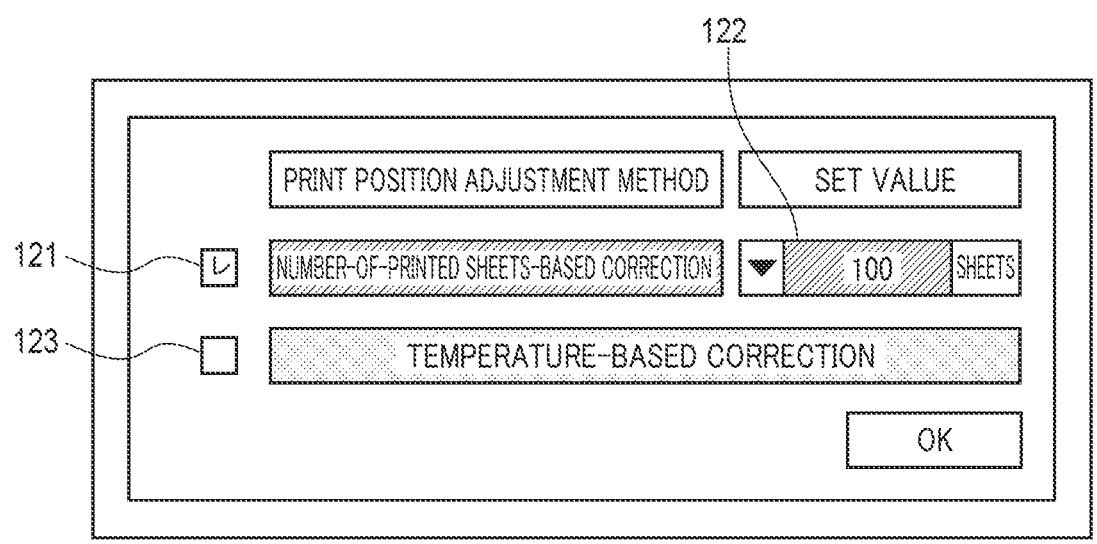

FIG. 8B shows a state in which the number-of-printed sheets-based correction button 121 is set to be enabled and the temperature-based correction button 123 is set to be disabled. The user is enabled to designate the number of printed sheets in the number-of-printed sheets designation field 122. Note that in the present embodiment, one number of printed sheets is designated by a user, and the designated number of printed sheets is applied to all of the sheet feeding cassettes of the sheet feeder 140. However, this setting may be configured such that a user can designate the number of printed sheets on a sheet feeding cassette-by-sheet feeding cassette basis. In this case, in a first process (FIG. 11) and a third process (FIG. 13), described hereinafter, the number of printed sheets is counted on a sheet feeding cassette-by-sheet feeding cassette basis, and the next print position adjustment is executed when the number of printed sheets of any sheet feeding cassette reaches the designated number of printed sheets.

Figure 9A:
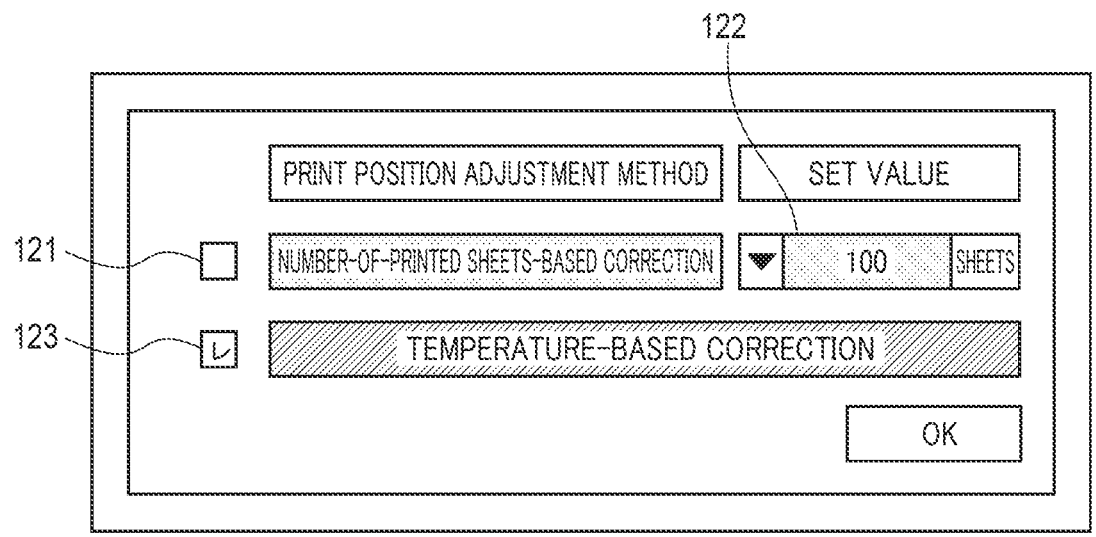
FIGS. 9A and 9B are diagrams each showing an example of the adjustment setting screen.
Figure 9B:
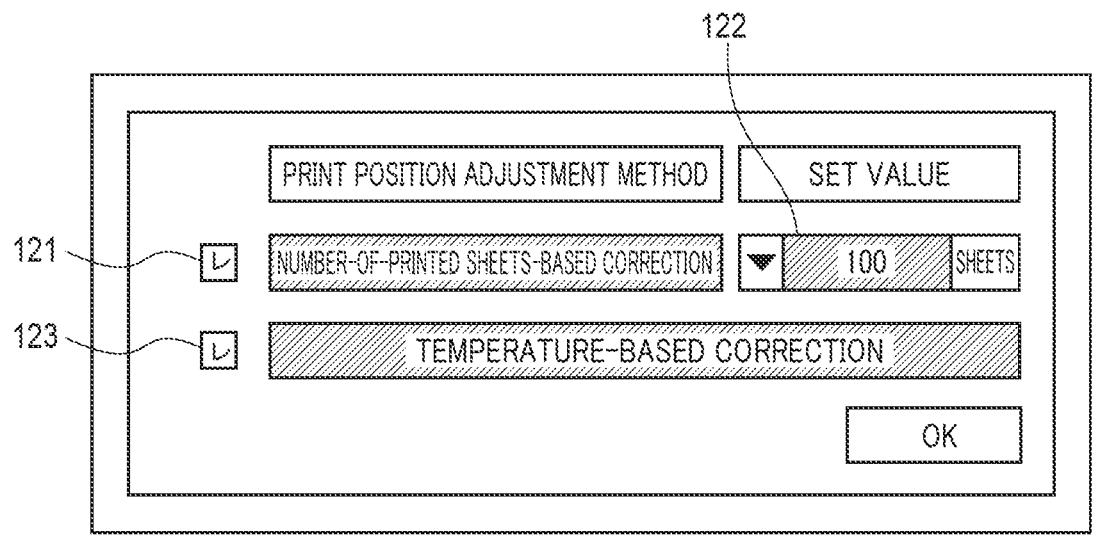

FIG. 9A shows a state in which the number-of-printed sheets-based correction button 121 is set to be disabled and the temperature-based correction button 123 is set to be enabled, i.e. checked. FIG. 9B shows a state in which the number-of-printed sheets-based correction button 121 and the temperature-based correction button 123 are both set to be enabled, i.e. checked.

As shown in FIGS. 8A, 8B, 9A, and 9B, since it is possible to receive the setting for enabling/disabling the first position adjustment and the setting for enabling/disabling the second position adjustment on the same screen from a common screen, the user can easily and collectively set designations concerning the execution timing of the print position adjustment process. Note that although the check boxes are employed as the number-of-printed sheets-based correction button 121 and the temperature-based correction button 123, this is not limitative, but it is only required to employ a method that enables a user to make a setting for enabling/disabling the position adjustment, including e.g. a method of using a radio button or a method of using a selection button.

Figure 10:
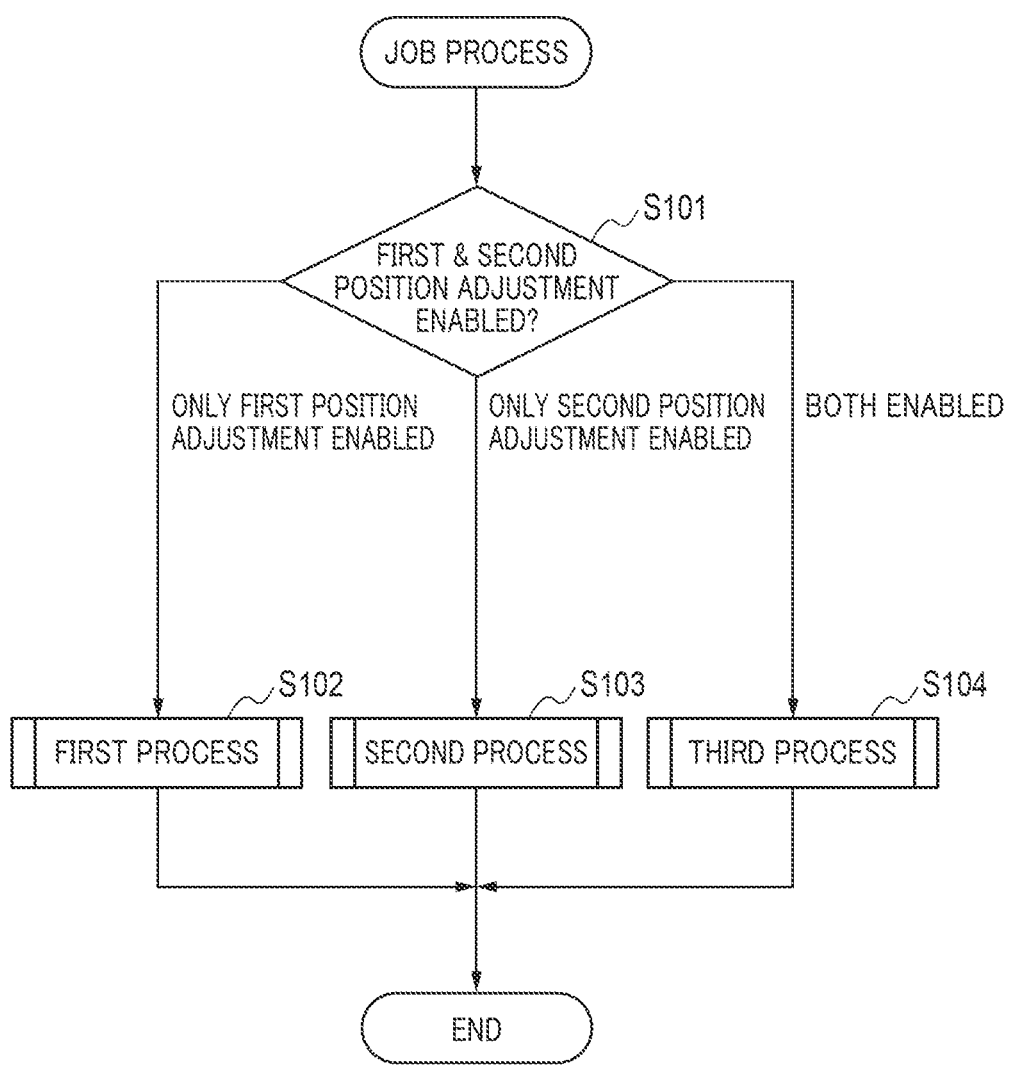
FIG. 10 is a flowchart of a job process.

FIG. 10 is a flowchart of a job process. This process is realized by the CPU 114 that loads an associated control program stored in the ROM 112 into the RAM 113 and executes the loaded program. This process is started when a print job is input. The print job is input e.g. by a user giving a print start instruction (pressing a print button or a copy button).

First, in a step S101, the CPU 114 determines whether or not each of the first position adjustment and the second position adjustment is enabled. This is determined based on whether or not one or both the number-of-printed sheets-based correction button 121 and the temperature-based correction button 123 (see e.g. FIG. 8A) is/are set to be enabled. If it is determined in the step S101 that the first position adjustment is enabled and the second position adjustment is disabled, in a step S102, the CPU 114 performs the first process described hereinafter with reference to FIG. 11. Further, if the second position adjustment is enabled and the first position adjustment is disabled, in a step S103, the CPU 114 performs a second process described hereinafter with reference to FIG. 12. Further, if the first position adjustment and the second position adjustment are both enabled, in a step S104, the CPU 114 performs the third process described hereinafter with reference to FIG. 13. After execution of the step S102, S103, or S104, the CPU 114 terminates the process in FIG. 10.

Figure 11:
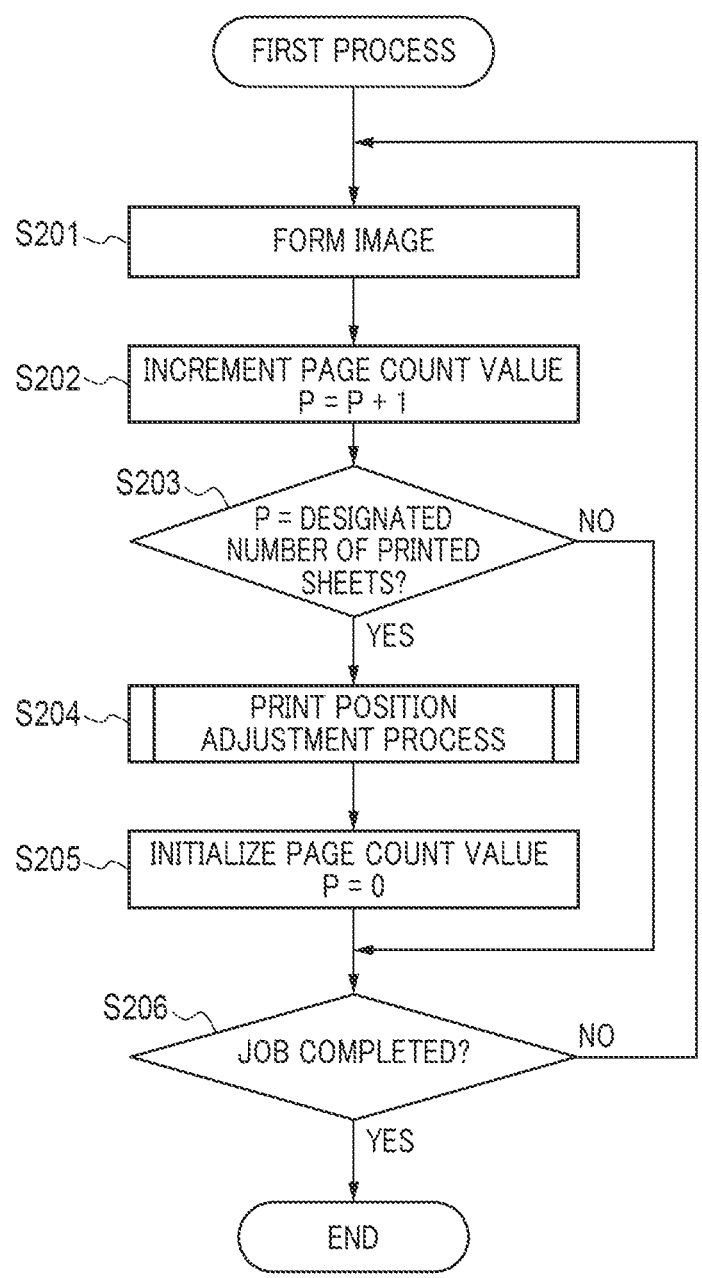
FIG. 11 is a flowchart of a first process.

FIG. 11 is a flowchart of the first process performed in the step S102 in FIG. 10. First, in a step S201, the CPU 114 executes the image forming operation. In this step, the CPU 114 forms an image of one page according to the input job. In a step S202, the CPU 114 increments a page count value P indicative of the number of printed sheets (P←P+1).

In a step S203, the CPU 114 determines whether or not the page count value P has reached the designated number of printed sheets, which is designated by the user in the number-of-printed sheets designation field 122. Then, if the page count value P has not reached the designated number of printed sheets, it is judged that the displacement amount of the print position is small, and hence the CPU 114 proceeds to a step S206. In the step S206, the CPU 114 determines whether or not the process of the print job input this time has been completed. If printing of all pages designated by the print job has not been completed, the CPU 114 determines that the process of the print job input this time has not been completed and returns to the step S201. On the other hand, if it is determined that the process of the print job input this time has been completed, the CPU 114 terminates the process in FIG. 11.

If it is determined in the step S203 that the page count value P has reached the designated number of printed sheets, in a step S204, the CPU 114 performs the print position adjustment process described hereinafter with reference to FIG. 14, and proceeds to a step S205. In the step S205, since the print position adjustment has been performed, the CPU 114 initializes the page count value P and proceeds to the step S206. Therefore, the print position adjustment is performed whenever the number of sheets printed after the last execution of the print position adjustment reaches the designated number of printed sheets.

Figure 12:
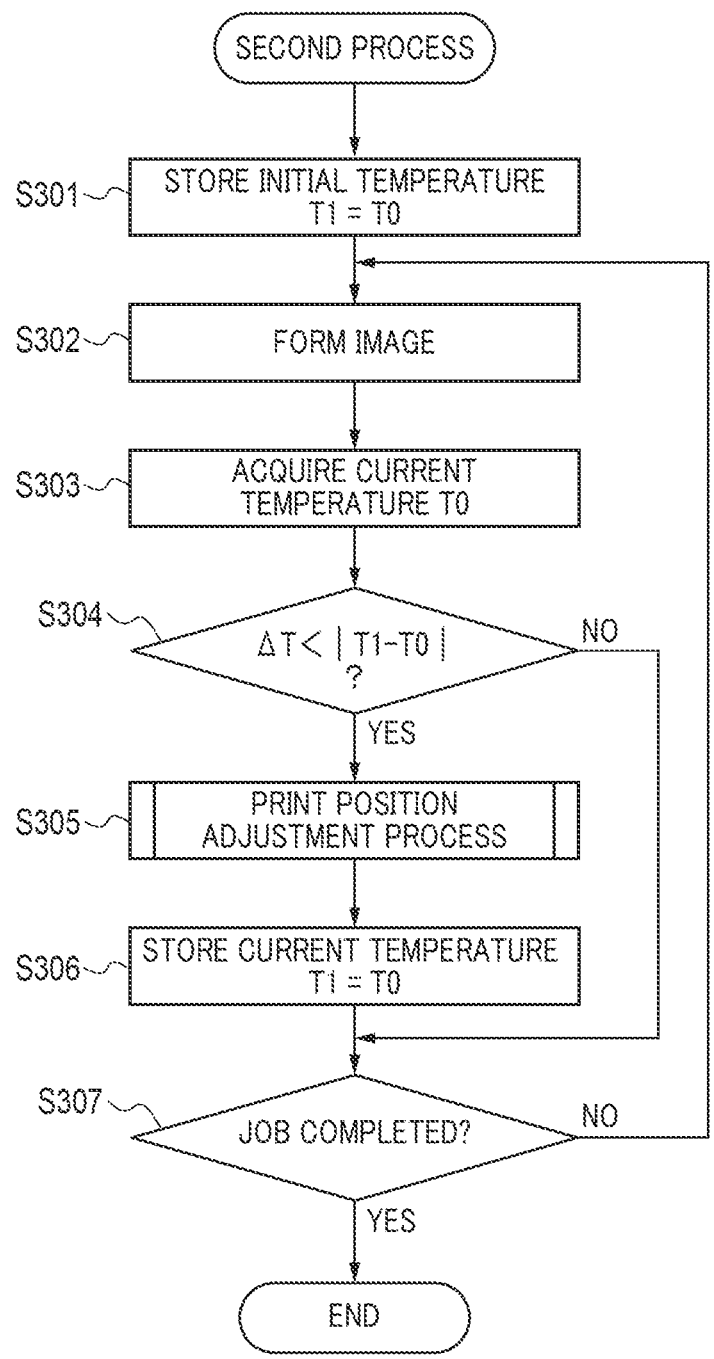
FIG. 12 is a flowchart of a second process.

FIG. 12 is a flowchart of the second process performed in the step S103 in FIG. 10. First, in a step S301, the CPU 114 acquires a temperature of the printer 150 (temperature of the exposure device 223) e.g. from the thermistor, not shown, as a current temperature T0, and stores the acquired current temperature T0 as a stored temperature T1 (T1←T0). The stored temperature T1 is stored in the RAM 113. Note that the stored temperature T1 indicates the temperature of the printer 150 stored at the last execution of the print position adjustment process (step S306). However, in the step S301, the current temperature T0 is stored as the initial value of the stored temperature T1.

In a step S302, the CPU 114 executes the same processing as in the step S201 in FIG. 11. In a step S303, the CPU 114 acquires the current temperature T0 of the printer 150. In a step S304, the CPU 114 calculates |T1−T0| as an amount of change in the temperature of the printer 150 after the last execution of the print position adjustment. The amount of change |T1−T0| is an absolute value of a difference between the stored temperature T1 and the current temperature T0. Further, the CPU 114 determines whether or not the amount of change |T1−T0| exceeds a predetermined amount ΔT (ΔT<|T1−T0|). The predetermined amount ΔT is e.g. 10° C., but is not limited to this value. Further the predetermined amount ΔT may be configured such that it can be set by a user on the adjustment setting screen (see e.g. FIG. 9A).

If it is determined in the step S304 that ΔT<|T1−T0| does not hold, it is judged that the displacement amount of the print position is small, and hence the CPU 114 proceeds to a step S307. On the other hand, if ΔT<|T1−T0| holds, the CPU 114 proceeds to a step S305. In the step S305, the CPU 114 performs the print position adjustment process described hereinafter with reference to FIG. 14 and then proceeds to the step S306. Therefore, in a case where the amount of change |T1−T0| of the temperature of the printer 150 after the last execution of the print position adjustment exceeds the predetermined amount ΔT, the print position adjustment is executed. In the step S306, the CPU 114 acquires the current temperature T0 and updates the stored temperature T1 to the acquired current temperature T0 (T1←T0). After that, in the step S307, the CPU 114 determines whether or not the process of the print job input this time has been completed. If it is determined that the process of the print job input this time has not been completed, the CPU 114 returns to the step S302. However, if it is determined that the process of the print job input this time has been completed, the CPU 114 terminates the process in FIG. 12.

Figure 13:
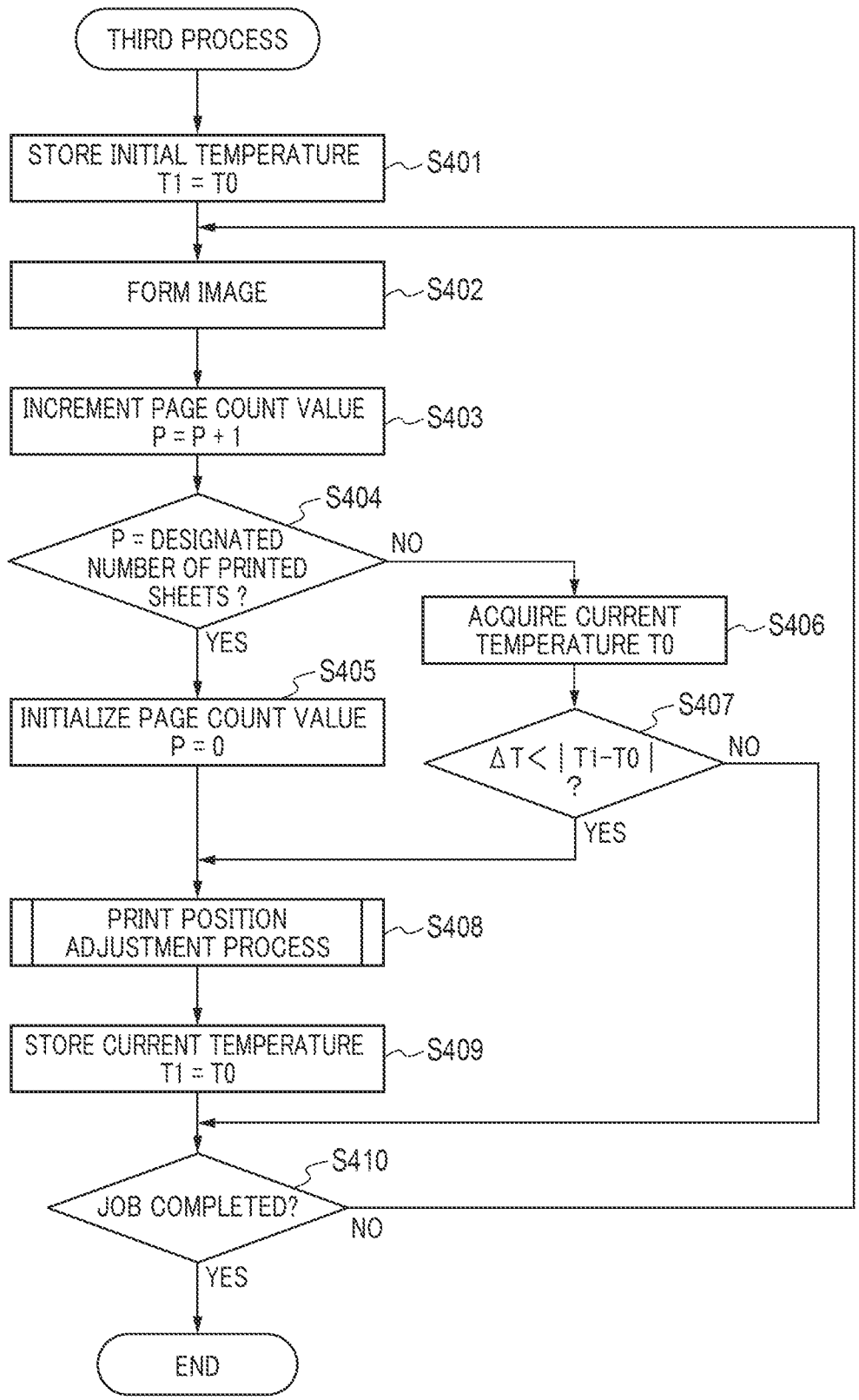
FIG. 13 is a flowchart of a third process.

FIG. 13 is a flowchart of the third process performed in the step S104 in FIG. 10. First, in steps S401 and S402, the CPU 114 executes the same processing as in the steps S301 and S302 in FIG. 12. In steps S403 and S404, the CPU 114 executes the same processing as in the steps S202 and S203 in FIG. 11. If it is determined in the step S404 that the page count value P has not reached the designated number of printed sheets, the CPU 114 proceeds to a step S406, whereas if the page count value P has reached the designated number of printed sheets, the CPU 114 proceeds to a step S405.

In the step S405, the CPU 114 initializes the page count value P and proceeds to a step S408. In the step S406 and a step S407, the CPU 114 executes the same processing as in the steps S303 and S304 in FIG. 12. If it is determined in the step S407 that ΔT<|T1−T0| does not hold, the CPU 114 proceeds to a step S410, whereas if ΔT<|T1−T0| holds, the CPU 114 proceeds to the step S408.

In the step S408, and steps S409 and S410, the CPU 114 executes the same processing as in the steps S305 to S307 in FIG. 12. Therefore, when the number of sheets printed after the last execution of the print position adjustment reaches the designated number of printed sheets, the print position adjustment is executed. Further, when the amount of change |T1−T0| of the temperature of the printer 150 after the last execution of the print position adjustment exceeds the predetermined amount ΔT, the print position adjustment is executed. If it is determined in the step S410 that the process of the print job input this time has not been completed, the CPU 114 returns to the step S402, whereas if it is determined that the process of the print job input this time has been completed, the CPU 114 terminates the process in FIG. 13.

Note that in a case where the setting is configured such that a user can designate the number of printed sheets for each sheet feeding cassette in the sheet feeder 140, the CPU 114 counts and resets the page count value P on a sheet feeding cassette-by-sheet feeding cassette basis, in the first process (FIG. 11) and the third process (FIG. 13). Then, the CPU 114 executes the print position adjustment when the page count value P reaches the designated number of printed sheets on a sheet feeding cassette-by-sheet feeding cassette basis. With this configuration, by designating the designated number of printed sheets e.g. to a value corresponding to the number of sheets set in a package, it is possible to properly cope with a change of the print position caused by variation in the cutting of sheets from one package to another.

Figure 14:
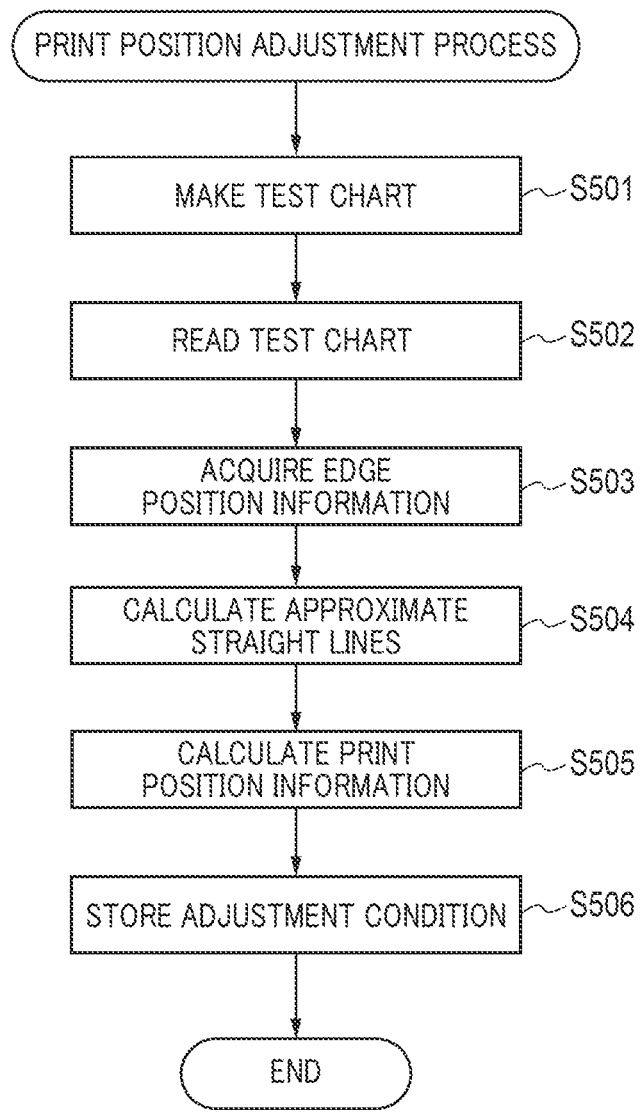
FIG. 14 is a flowchart of a print position adjustment process.

FIG. 14 is a flowchart of the print position adjustment process. This process is executed in the step S204 in FIG. 11, the step S305 in FIG. 12, and the step S408 in FIG. 13. The print position adjustment process is a series of operations of a position adjustment process in which the CPU 114 causes the printer 150 to print a test chart, causes the reading device 160 to read the test chart, and generates the above-described adjustment condition based on read data generated by reading the test chart.

First, in a step S501, the CPU 114 cause a test chart to be made. More specifically, the CPU 114 reads out image data for printing an adjustment chart to make the test chart from the image memory 303 and causes the printer 150 to print the adjustment chart on a sheet to thereby make the test chart. In a step S502, the CPU 114 causes the reading device 160 to read the test chart thus made to thereby generate read data. In a step S503, as described with reference to FIG. 5A, the CPU 114 acquires the edge detection ranges (xdet_st_m to xdet_ed_m and ydet_st_m to ydet_ed_m: m represents a value from 0 or 1). Further, the CPU 114 detects edges of each mark in the acquired edge detection ranges.

In a step S504, as described with reference to FIG. 5B, the CPU 114 calculates the approximate straight line L1 from the position of the edge of the front end of the mark and the approximate straight line L2 from the position of the edge of the side end of the mark with respect to each of the marks M0 to M3. In a step S505, the CPU 114 calculates (identifies) an intersection of the approximate straight line L1 and the approximate straight line L2 as each of the position information items P0 to P3 of the respective marks M. The CPU 114 performs this processing for the marks M0 to M3 on the front and reverse sides, respectively. In a step S506, as described with reference to FIG. 6, the CPU 114 calculates the main scanning widths H_0 and H_1, the sub scanning widths, and so forth, from the position information P0 to P3, to generate the adjustment condition. Further, the CPU 114 stores the generated adjustment condition in the RAM 113 or the HDD 115. Then, the CPU 114 terminates the process in FIG. 14. As described hereinabove, the CPU 114 outputs the adjustment condition to the printer 150 to cause the adjustment condition to be reflected on image formation when the next image formation is performed. For example, the CPU 114 refers to the adjustment condition and adjusts the print position such that displacement of the print position is eliminated. For example, displacement of the print position on each of the front side and the reverse side and displacement of the print position between the front side and the reverse side are also eliminated.

According to the present embodiment, the CPU 114 receives the setting for enabling/disabling execution of the print position adjustment process (first position adjustment) whenever a designated number of sheets is printed from the number-of-printed sheets-based correction button 121 on the console panel 120. The CPU 114 performs, on condition that the first position adjustment is set to be enabled, the print position adjustment process (the series of operations of the position adjustment process) in a case where the number of sheets printed by the printer 150 after the last execution of the print position adjustment process reaches the designated number of printed sheets. The adjustment condition generated in the print position adjustment process is output to the printer 150 when the next image formation is performed. This makes it possible to perform adjustment of the image formation position at a timing determined based on the number of printed sheets according to a user's request. For example, by designating the designated number of printed sheets to a value corresponding to the number of sheets set in a package, it is possible to perform the print position adjustment process at a timing when the package is changed.

Further, the CPU 114 receives the setting for enabling/disabling execution of the print position adjustment process (second position adjustment) based on a change in the temperature of the printer 150 from the temperature-based correction button 123 on the console panel 120. The CPU 114 executes, on condition that the second position adjustment is set to be enabled, the print position adjustment process in a case where the amount of change |T1−T0| of the temperature of the printer 150 after the last execution of the print position adjustment process exceeds the predetermined amount ΔT. This makes it possible to perform adjustment of the image formation position at a timing determined based on changes in the temperature of the image forming section (the printer 150) according to a user's request. For example, the print position adjustment is executed in a situation in which deformation caused by heat or thermal shrink occurs, whereas the print position adjustment is not executed when the apparatus is shifted to the equilibrium state. Therefore, the image formation position is properly adjusted, and wasteful consumption of sheets is avoided.

Further, in a case where the first and second position adjustment settings are both set enabled, the print position adjustment process is performed when the number of sheets printed by the printer 150 after the last execution of the print position adjustment process reaches the designated number of printed sheets or when the amount of change |T1−T0| exceeds the predetermined amount ΔT. Therefore, the user can designate the execution timing of the print position adjustment such that it is determined not depending on the elapsed time, but depending on at least one of the number of printed sheets and a change in the temperature. Therefore, it is possible to execute the print position adjustment at a proper timing.

Note that the controller 110, which functions as the information processing apparatus, is provided within the image forming apparatus 100. However, this is not limitative, but for example, the controller 110, which functions as the information processing apparatus, may be provided in an external apparatus which can communicate with the image forming apparatus 100 via the network 105. For example, the controller 110 may be provided in the host computer 101. In this case, a CPU of the host computer 101 functions as the information processing apparatus. In a case where the information processing apparatus is thus configured, in the print position adjustment process, the host computer 101 as the processing unit, first, outputs image data for forming the test chart to the image forming apparatus 100. Then, the host computer 101 acquires read data of the test chart by the image forming apparatus 100 (reading device 160), and generates the above-described adjustment condition based on the read data. After that, the host computer 101 as the output unit outputs the generated adjustment condition to the image forming apparatus 100.

Note that in the present embodiment, the image forming apparatus 100 is configured to include the controller 110, the console panel 120, the sheet feeder 140, the printer 150, and the reading device 160. However, the printer 150 alone may be referred to as the information processing apparatus or the image forming apparatus of the present invention. Alternatively, a system formed by adding at least one of the sheet feeder 140, the reading device 160, and the finisher 190 to the printer 150 may be referred to as the information processing apparatus or the image forming apparatus of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-236552, filed Dec. 26, 2019, which is hereby incorporated by reference herein in its entirety.

What is claimed is:

1. An information processing apparatus comprising:
a display that displays a plurality of adjustment modes for causing an image forming apparatus to print an adjustment chart, the adjustment chart being for use in adjusting geometrical characteristics of an image which is printed on a sheet; and
a controller configured to:
receive first information indicating whether or not to execute a first adjustment mode for causing the image forming apparatus to print the adjustment chart based on the number of sheets on which images have been printed by the image forming apparatus; and
receive second information indicating whether or not to execute a second adjustment mode for causing the image forming apparatus to print the adjustment chart based on a result of detection by a temperature sensor provided in the image forming apparatus.

2. The information processing apparatus according to claim 1, wherein the controller receives third information on the number of sheets on which images have been printed, in the first adjustment mode, and
wherein the image forming apparatus controls timing of printing the adjustment chart based on the third information, in a case where the first adjustment mode is executed.

3. The information processing apparatus according to claim 1, wherein the image forming apparatus controls timing of printing the adjustment chart, based on a difference between temperatures detected at different timings, in the second adjustment mode.

4. The information processing apparatus according to claim 1, wherein the controller acquires read data concerning the adjustment chart on the sheet,
wherein the controller performs image processing on image data based on the read data, and
wherein the image forming apparatus prints an image based on the image data on which the image processing has been performed by the controller.

5. An image forming apparatus comprising:
an image forming unit that forms an image on a sheet;
a sensor that detects a temperature;
a display; and
a controller configured to:
control the image forming unit so as to form an adjustment chart on a sheet, based an adjustment mode, the adjustment mode including a first adjustment mode for causing the image forming unit to form the adjustment chart based on the number of sheets on which images have been formed by the image forming unit and a second adjustment mode for causing the image forming unit to form the adjustment chart based on a result of detection by the sensor;
acquire read data concerning the adjustment chart on the sheet;
control geometrical characteristics of an image which is formed on a sheet by the image forming unit, based on the read data;
control the display to display the first and second adjustment modes for causing the image forming unit to form the adjustment chart;
receive first information indicating whether or not to execute the first adjustment mode; and
receive second information indicating whether or not to execute the second adjustment mode.

6. The image forming apparatus according to claim 5, wherein the controller receives third information on the number of sheets on which images have been formed, and
wherein the image forming unit controls timing of forming the adjustment chart based on the third information, in the first adjustment mode.

7. The image forming apparatus according to claim 5, wherein the image forming unit controls timing of forming the adjustment chart based on a difference between temperatures detected at different timings, in the second adjustment mode.

8. The image forming apparatus according to claim 5, wherein the controller performs image processing on image data based on the read data, and
wherein the image forming unit forms an image based on the image data on which the image processing has been performed by the controller.

* * * * *